(12) United States Patent
Wei et al.

(10) Patent No.: US 9,776,871 B2
(45) Date of Patent: *Oct. 3, 2017

(54) METHOD FOR FORMING CARBON NANOTUBE FILM

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 432 days.

This patent is subject to a terminal disclaimer.

(21) Appl. No.: 14/316,747

(22) Filed: Jun. 26, 2014

(65) Prior Publication Data

US 2015/0291426 A1 Oct. 15, 2015

(30) Foreign Application Priority Data

Apr. 14, 2014 (CN) .......................... 2014 1 01594609

(51) Int. Cl.
*C01B 31/02* (2006.01)
*B82Y 40/00* (2011.01)

(52) U.S. Cl.
CPC ............ *C01B 31/024* (2013.01); *B82Y 40/00* (2013.01); *C01B 31/0226* (2013.01); *C01B 31/0253* (2013.01); *C01B 2202/08* (2013.01)

(58) Field of Classification Search
CPC .......................... C01B 31/024; C01B 31/0226
See application file for complete search history.

(56) References Cited

U.S. PATENT DOCUMENTS

| 8,048,256 | B2 | 11/2011 | Feng et al. |
| 8,068,626 | B2 | 11/2011 | Jiang et al. |
| 8,101,953 | B2 | 1/2012 | Jiang et al. |
| 8,247,036 | B2 | 8/2012 | Jiang et al. |
| 8,248,377 | B2 | 8/2012 | Jiang et al. |
| 8,269,932 | B2 | 9/2012 | Fu et al. |

(Continued)

FOREIGN PATENT DOCUMENTS

| CN | 101239712 | 8/2008 |
| CN | 101506413 | 8/2009 |

(Continued)

OTHER PUBLICATIONS

"Superaligned Carbon Nanotube Arrays, Films, and Yarns: A Road to Applications", Kaili Jiang et al.. Advanced Materials, vol. 23, pp. 1154-1161.

(Continued)

*Primary Examiner* — Benjamin Schiffman
(74) *Attorney, Agent, or Firm* — Steven Reiss

(57) ABSTRACT

A method for forming a carbon nanotube film is provided. An elastic substitute substrate and a carbon nanotube array transferred on a surface of the elastic substitute substrate are used. The carbon nanotube array is configured for drawing a carbon nanotube film therefrom. The carbon nanotube film has carbon nanotubes joined end to end. The elastic substitute substrate is stretched along a plurality of directions to increase lengths of the carbon nanotube array along the plurality of directions. The carbon nanotube film is drawn from the stretching carbon nanotube array.

20 Claims, 13 Drawing Sheets

(56) References Cited

U.S. PATENT DOCUMENTS

| | | |
|---|---|---|
| 2008/0248235 A1 | 10/2008 | Feng et al. |
| 2010/0075024 A1 | 3/2010 | Ajayan et al. |
| 2010/0123267 A1 | 5/2010 | Jiang et al. |
| 2010/0170891 A1 | 7/2010 | Feng et al. |
| 2011/0039075 A1 | 2/2011 | Feng et al. |
| 2011/0140309 A1 | 6/2011 | Liu et al. |
| 2011/0171419 A1 | 7/2011 | Li et al. |
| 2011/0233816 A1 | 9/2011 | Liu |
| 2012/0321785 A1 | 12/2012 | Rogers et al. |
| 2013/0026679 A1 | 1/2013 | Chen et al. |
| 2013/0255565 A1 | 10/2013 | Wei et al. |

FOREIGN PATENT DOCUMENTS

| | | |
|---|---|---|
| CN | 101870463 | 10/2010 |
| CN | 101993055 | 3/2011 |
| CN | 102598191 | 7/2012 |
| TW | 200741747 | 11/2007 |
| TW | 201020204 | 6/2010 |
| TW | 201125042 | 7/2011 |
| TW | 201125814 | 8/2011 |
| TW | 201125814 A | 8/2011 |
| TW | 201134755 | 10/2011 |
| TW | 201134755 A | 10/2011 |
| TW | 201241876 | 10/2012 |
| TW | 201339088 | 10/2013 |

OTHER PUBLICATIONS

"A stretchable carbon nanotube strain sensor for human-motion detection", Takeo Yamada et al.; nature nanotechnology; vol. 6; pp. 296-301.

"Dry-Transfer of Aligned Mul tiwalled Carbon Nanotubes for Flexible Transparent Thin Films", Journal of Nanomaterials; vol. 2012; pp. 1-8.

METHOD FOR FORMING CARBON NANOTUBE FILM

CROSS-REFERENCE TO RELATED APPLICATIONS

This application claims all benefits accruing under 35 U.S.C. §119 from China Patent Application No. 201410159460.9, filed on Apr. 14, 2014 in the China Intellectual Property Office, the contents of which are hereby incorporated by reference. This application is related to applications Ser. No. 14/316,749 entitled, "METHOD FOR FORMING CARBON NANOTUBE FILM", filed Jun. 26, 2014 and Ser. No. 14/316,750 "METHOD FOR FORMING CARBON NANOTUBE FILM", filed Jun. 26, 2014.

FIELD

The subject matter herein generally relates to methods for forming carbon nanotube films.

BACKGROUND

Carbon nanotube structures can be fabricated by drawing from a carbon nanotube array grown on a growing substrate (e.g., silicon wafer), as disclosed by U.S. Pat. No. 8,048,256 to Feng et al. The carbon nanotube film is free standing and includes a plurality of carbon nanotubes joined end-to-end by van der Waals attractive force therebetween. The carbon nanotubes in the carbon nanotube film are substantially aligned along the lengthwise direction of the carbon nanotube film, and thus, the carbon nanotube film has good thermal and electrical conductivity along the direction of the aligned carbon nanotubes. The carbon nanotube film is substantially transparent and can be used as a conductive thin film. Therefore, the carbon nanotube film can be used in many different fields, such as touch panels, liquid crystal displays, speakers, heating devices, thin film transistors, cables, and the like.

BRIEF DESCRIPTION OF THE DRAWINGS

Implementations of the present technology will now be described, by way of example only, with reference to the attached figures, wherein.

DETAILED DESCRIPTION

Figure 1:
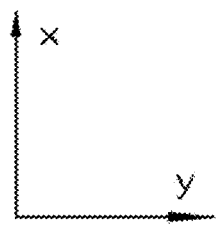
FIG. 1 is a schematic top view of an embodiment of a method for forming a carbon nanotube film.
Figure 1:
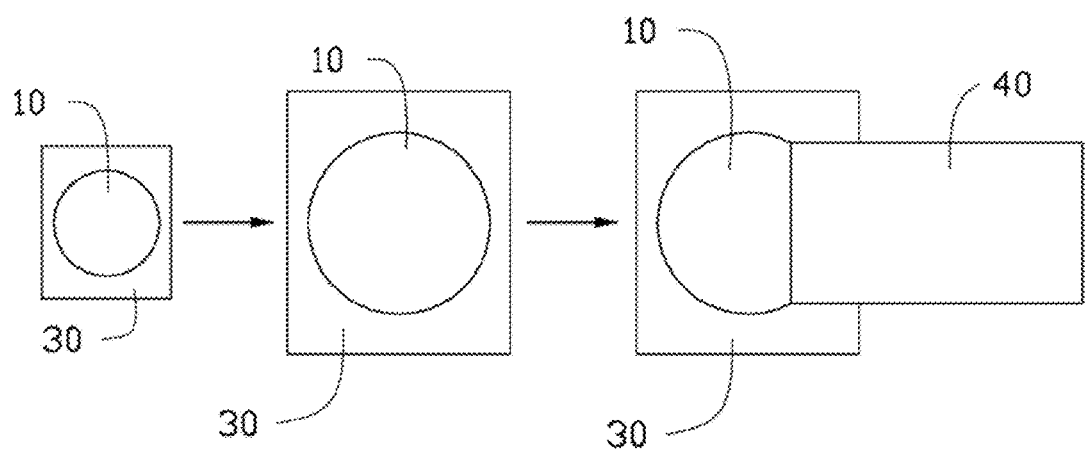

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other description that is described, such that the component need not be exactly conforming to the description. The term "comprising," when utilized, means "including, but not necessarily limited to"; it specifically indicates open-ended inclusion or membership in the so-described combination, group, series, and the like.

Referring to FIG. 1, the present disclosure is described in relation to a method for forming a carbon nanotube film.

In block 51, a carbon nanotube array 10 transferred on an elastic substitute substrate 30 is provided. The carbon nanotube array 10 is in a state that is capable of having the carbon nanotube film 40 drawn therefrom. The carbon nanotube film 40 can be a free-standing structure including a plurality of carbon nanotubes joined end-to-end by van der Waals attractive force therebetween.

In block S2, at least one groove 12 is formed on the carbon nanotube array 10. Block S2 is optional.

In block S3, the elastic substitute substrate 30 is stretched along a plurality of directions to increase lengths of the carbon nanotube array 10 along the plurality of directions.

In block S4, the carbon nanotube film 40 is drawn from the carbon nanotube array 10.

[Transferring of Carbon Nanotube Array]

One embodiment of a method for transferring a carbon nanotube array 10 to the elastic substitute substrate 30 includes blocks S11 and S12.

In block S11, a growing substrate 20 having the carbon nanotube array 10 grown thereon is provided.

In block S12, the carbon nanotube array 10 is transferred from the growing substrate 20 onto the elastic substitute substrate 30. The state of the carbon nanotube array 10 before, during, and after the transfer onto the elastic substitute substrate 30 is still capable of having the carbon nanotube film 40 drawn therefrom.

The carbon nanotube array 10 is grown on the growing substrate 20 by a chemical vapor deposition (CVD) method. The carbon nanotube array 10 includes a plurality of carbon nanotubes oriented substantially perpendicular to a growing surface of the growing substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube film 40. The carbon nanotube array 10 that can have the carbon nanotube film 40 drawn therefrom can be a super aligned carbon nanotube array. A material of the growing substrate 20 can be P-type silicon, N-type silicon, or other materials that are suitable for growing the super aligned carbon nanotube array.

The carbon nanotube film 40 drawn from the carbon nanotube array 10 includes a plurality of carbon nanotubes joined end-to-end and can be a free-standing carbon nanotube film. The carbon nanotube film includes a plurality of carbon nanotubes substantially aligned along the same direction.

Figure 2:
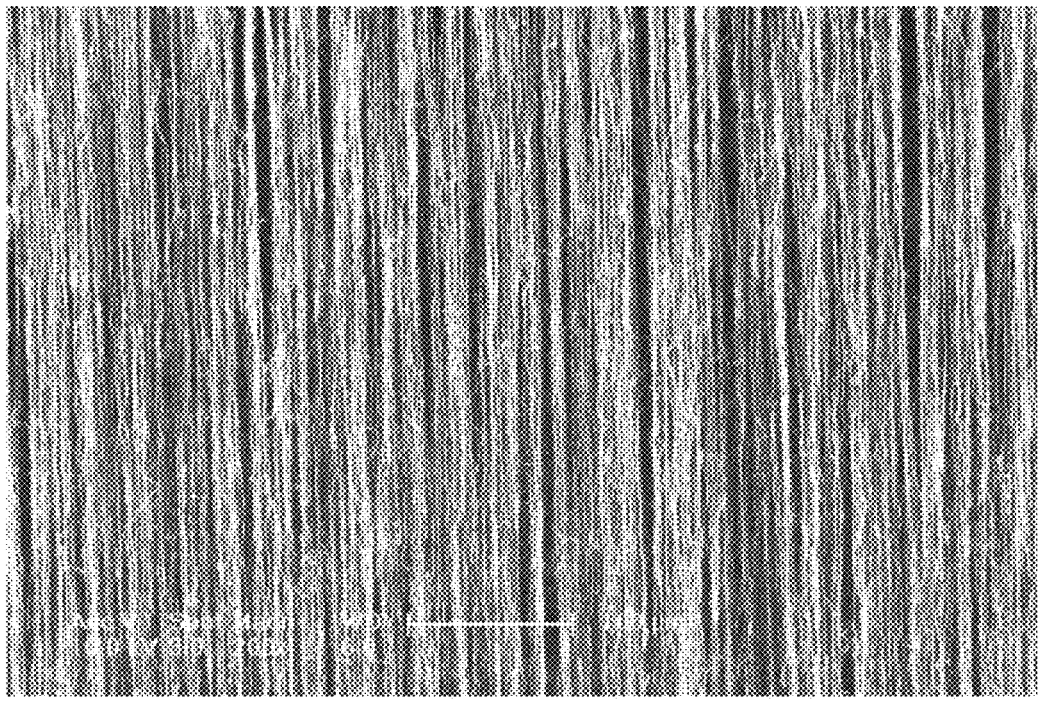
FIG. 2 shows a scanning electron microscope (SEM) image of a carbon nanotube film drawn from a carbon nanotube array.
Figure 3:
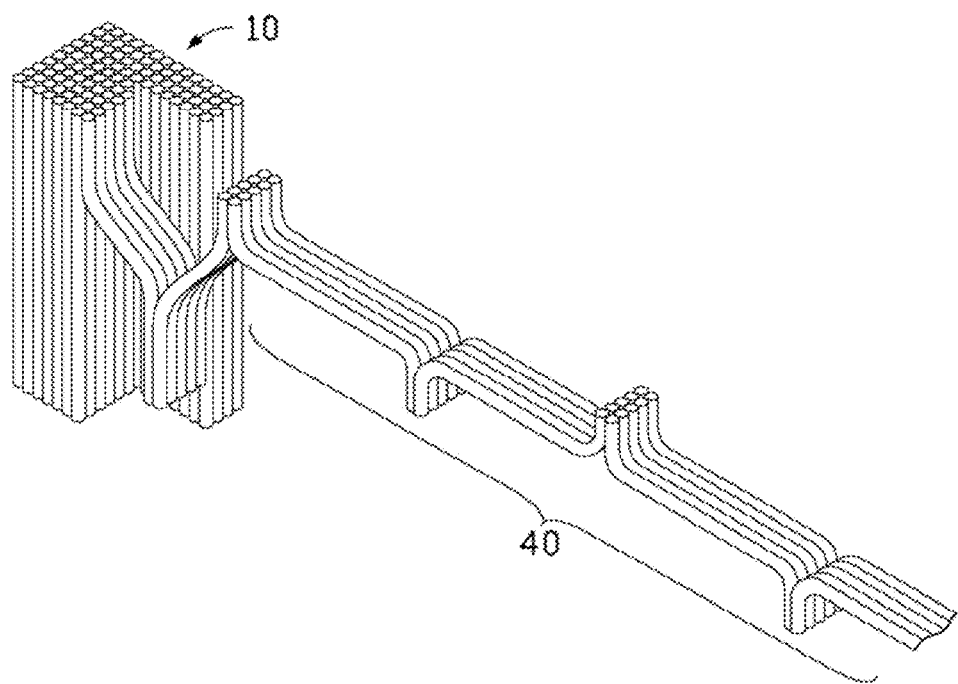
FIG. 3 shows carbon nanotubes joined end-to-end.

Referring to FIG. 2 and FIG. 3, the carbon nanotube film 40 can include or consist of a plurality of carbon nanotubes. In the carbon nanotube film 40, the overall aligned direction of a majority of the carbon nanotubes is substantially aligned along the same direction parallel to a surface of the carbon nanotube film 40. A majority of the carbon nanotubes are substantially aligned along the same direction in the carbon nanotube film 40. Along the aligned direction of the majority of carbon nanotubes, each carbon nanotube is joined to adjacent carbon nanotubes end to end by van der Waals attractive force therebetween, whereby the carbon nanotube film 40 is capable of being free-standing structure. There may be a minority of carbon nanotubes in the carbon nanotube film 40 that are randomly aligned. However, the number of the randomly aligned carbon nanotubes is very small and does not affect the overall oriented alignment of the majority of carbon nanotubes in the carbon nanotube film 40. Some of the majority of the carbon nanotubes in the carbon nanotube film 40 that are substantially aligned along the same direction may not be exactly straight, and can be curved at a certain degree, or not exactly aligned along the overall aligned direction by a certain degree. Therefore, partial contacts can exist between the juxtaposed carbon nanotubes in the majority of the carbon nanotubes aligned along the same direction in the carbon nanotube film 40. The carbon nanotube film 40 can include a plurality of successive and oriented carbon nanotube segments. The plurality of carbon nanotube segments are joined end to end by van der Waals attractive force. Each carbon nanotube segment includes a plurality of carbon nanotubes substantially parallel to each other, and the plurality of paralleled carbon nanotubes are in contact with each other and combined by van der Waals attractive force therebetween. The carbon nanotube segment has a desired length, thickness, uniformity, and shape. There can be clearances between adjacent and juxtaposed carbon nanotubes in the carbon nanotube film 40. A thickness of the carbon nanotube film 40 at the thickest location is about 0.5 nanometers to about 100 microns (e.g., in a range from 0.5 nanometers to about 10 microns).

The term "free-standing" includes, but is not limited to, a carbon nanotube film 40 that does not need to be supported by a substrate. For example, a free-standing carbon nanotube film 40 can sustain the weight of itself when it is hoisted by a portion thereof without any significant damage to its structural integrity. If the free-standing carbon nanotube film 40 is placed between two separate supporters, a portion of the free-standing carbon nanotube film 40 suspended between the two supporters can maintain structural integrity. The free-standing carbon nanotube film 40 is realized by the successive carbon nanotubes joined end to end by van der Waals attractive force.

In the present disclosure, the growing of the carbon nanotube array 10 and the drawing of the carbon nanotube film 40 are processed on different structures (i.e., the growing substrate 20 and the elastic substitute substrate 30). The elastic substitute substrate 30 for drawing the carbon nanotube film 40 can be made of low-price materials, and the growing substrate 20 can be recycled quickly. Thus, production of the carbon nanotube film 40 can be optimized.

Figure 4:
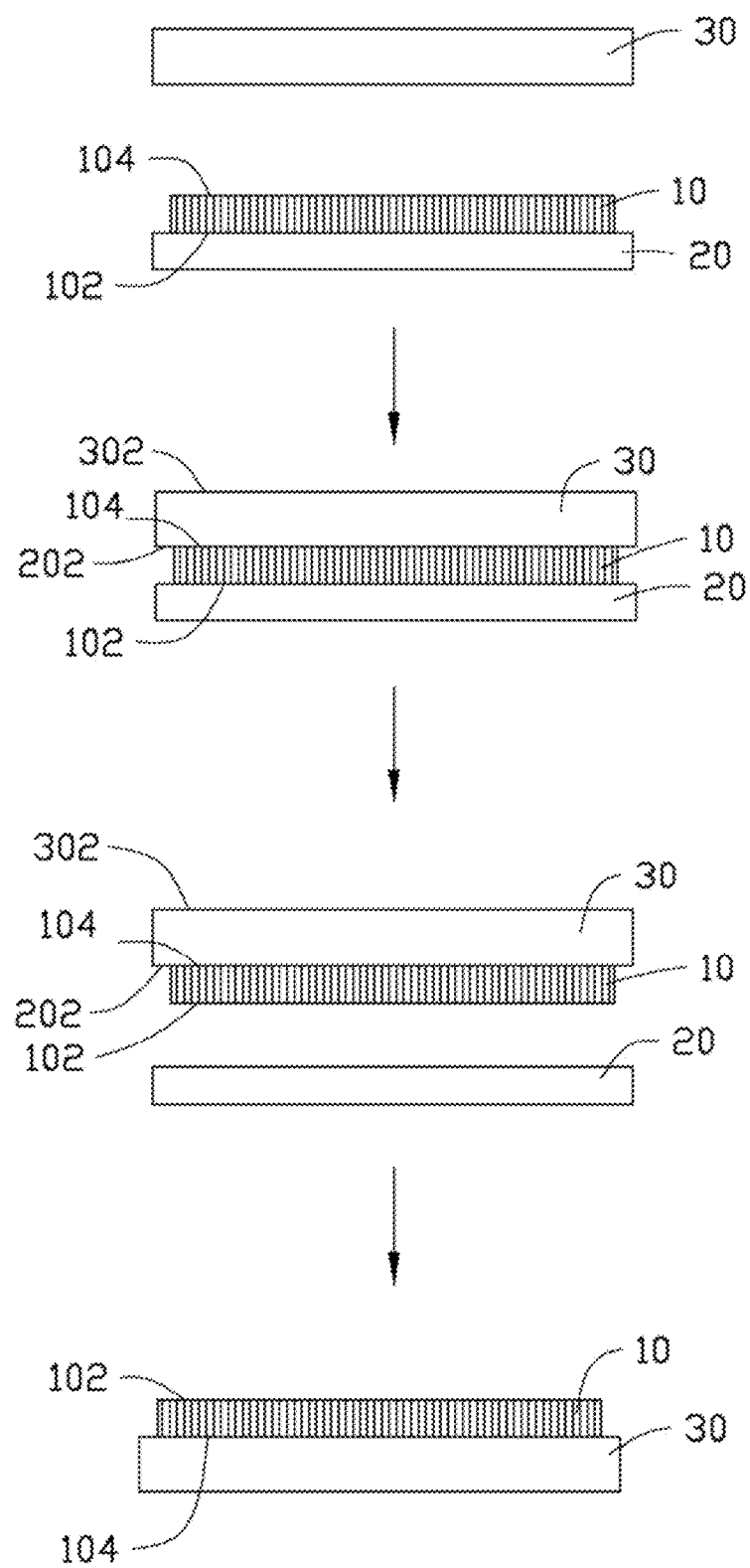
FIG. 4 is a schematic side view of an embodiment of a method for transferring a carbon nanotube array.

Referring to FIG. 4, the elastic substitute substrate 30 can be a soft, elastic, and solid substrate. The elastic substitute substrate 30 has a surface 302 to accept the carbon nanotube array 10 thereon. During transferring of the carbon nanotube array 10 from the growing substrate 20 to the surface 302 of the elastic substitute substrate 30, the state of the carbon nanotube array 10 is still capable of drawing the carbon nanotube film 40 from the carbon nanotube array 10 on the elastic substitute substrate 30. That is, the carbon nanotube array 10 transferred to the elastic substitute substrate 30 is still a super aligned carbon nanotube array.

The carbon nanotube array 10 is arranged upside down on the surface 302 of the elastic substitute substrate 30. The carbon nanotubes are grown from the growing surface 202 of the growing substrate 20 to form the carbon nanotube array 10. The carbon nanotube includes a bottom end adjacent to or contacting the surface 202 of the growing substrate 20 and a top end away from the surface 202 of the growing substrate 20. The bottom ends of the carbon nanotubes form the bottom surface 102 of the carbon nanotube array 10, and the top ends of the carbon nanotubes form the top surface 104 of the carbon nanotube array 10. After the carbon nanotube array 10 is transferred to the elastic substitute substrate 30, the top surface 104 of the carbon nanotube array 10 is now adjacent to or contacting the surface 302 of the elastic substitute substrate 30, and the bottom surface 102 of the carbon nanotube array 10 is now away from the surface 302 of the elastic substitute substrate 30.

In one embodiment, block S12 includes blocks A121 and A122.

In block A121, the elastic substitute substrate 30 and the carbon nanotube array 10 on the growing substrate 20 are brought together such that the surface 302 of the elastic substitute substrate 30 and the top surface 104 of the carbon nanotube array 10 are contacting each other.

In block A122, the elastic substitute substrate 30 and the growing substrate 20 are moved away from each other, thereby separating the carbon nanotube array 10 from the growing substrate 20.

The carbon nanotube array 10 can be transferred from the growing substrate 20 to the elastic substitute substrate 30 at room temperature (e.g., 10° C. to 40° C.).

The surface of the elastic substitute substrate 30 and the top surface 104 of the carbon nanotube array 10 can be bonded by van der Waals attractive forces, and a bonding force ($F_{BC}$) between the carbon nanotube array 10 and the elastic substitute substrate 30 is smaller than the van der Waals attractive forces ($F_{CC}$) between the carbon nanotubes in the carbon nanotube array 10. Meanwhile, the bonding force $F_{BC}$ is larger than the bonding force ($F_{AC}$) between the carbon nanotube array 10 and the growing substrate 20, to separate the carbon nanotube array 10 from the growing substrate 20. Therefore, $F_{AC}<F_{BC}<F_{CC}$ must be satisfied.

To satisfy $F_{AC}<F_{BC}<F_{CC}$, the elastic substitute substrate 30 can have a suitable surface energy and a suitable interface energy can exist between the elastic substitute substrate 30 and the carbon nanotube array 10. Thus, the elastic substitute substrate 30 can generate enough bonding force (e.g., van der Waals attractive force) with the carbon nanotube array 10 simply by contacting the carbon nanotube array 10. A suitable material of the elastic substitute substrate 30 must have a sufficient bonding force $F_{BC}$ (e.g., van der Waals attractive force) with the top surface 104 of the carbon nanotube array 10 to overcome the bonding force $F_{AC}$ between the carbon nanotube array 10 from the growing substrate 20. The surface 302 of the elastic substitute substrate 30 can be substantially flat. In one embodiment, the material of the elastic substitute substrate 30 is poly(dimethylsiloxane) (PDMS).

The elastic substitute substrate 30 can adhere to the carbon nanotube array 10 without an adhesive binder and only by van der Waals attractive forces. Although the adhesive binder can have a bonding force with the carbon nanotube array greater than the bonding force between the carbon nanotube array 10 and the growing substrate 20, because the van der Waals attractive force between the carbon nanotubes in the carbon nanotube array 10 is small, the adhesive binder must have a bonding force with the carbon nanotube array 10 sufficiently less than the bonding force $F_{CC}$ between the carbon nanotubes in the carbon nanotube array 10. Otherwise, the carbon nanotube film 40 cannot be drawn from the transferred carbon nanotube array 10. In blocks A121 and A122, the elastic substitute substrate 30 can always be in a solid state.

Figure 5:
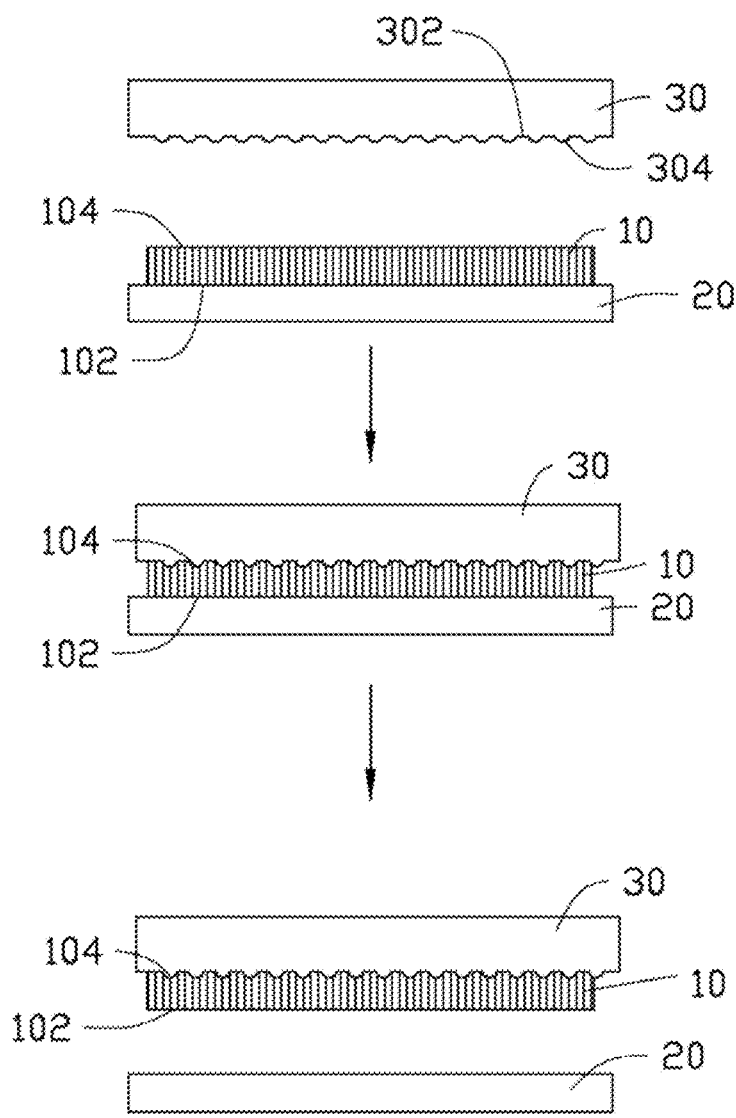
FIG. 5 is a schematic side view of another embodiment of the method for transferring the carbon nanotube array.

Referring to FIG. 5, in one embodiment, to satisfy $F_{AC}<F_{BC}<F_{CC}$, the substitute substrate 30 can increase the surface area of the surface 302 by using the microstructures 304, thus increasing the $F_{BC}$. The elastic substitute substrate 30 can have the surface 302 with a plurality of microstructures 304 located thereon. The microstructure 304 can have a point shape and/or a long and narrow shape, and can be protrusions and/or recesses. The cross section of the microstructures 304 can be semicircular, rectangular, conical, and/or stepped. The microstructures 304 can be hemispheres, convex or concave columns, pyramids, pyramids without tips, and any combination thereof. In one embodiment, the microstructures 304 can be parallel and spaced grooves. In another embodiment, the microstructures 304 can be uniformly spaced hemispherical protrusions. The plurality of microstructures 304 are uniformly distributed on the surface 304 of the elastic substitute substrate 30. In one embodiment, the surface 302 having the microstructures 304 located thereon has a surface area of 30% to 120% more than a smooth surface. The surface 302 sufficiently contacts the top surface 104 of the carbon nanotube array 10. The material of the elastic substitute substrate 30 is not limited and can be at least one of plastic and resin, such as polymethyl methacrylate and/or polyethylene terephthalate.

The height of the protrusion and the depth of the recess of the microstructures 304 can be 0.5% to 10% of the height of the carbon nanotube array 10. In one embodiment, the height of the protrusion and the depth of the recess can be in a range from about 5 microns to about 50 microns. The surface 302 needs an overall flatness to sufficiently contact the top surface 104 of the carbon nanotube array 10. The microstructures 304 can be formed on the surface 302 by laser etching, chemical etching, or lithography.

The microstructures 304 make the surface 302 of the elastic substitute substrate 30 rough. In block A121, when the recessed portion of the surface 302 is in contact with the top surface 104 of the carbon nanotube array 10, the protruded portion of the surface 302 may slightly curve the carbon nanotubes contacting the protruded portion. However, the microstructures 304 are small, so the curve is small, and when the elastic substitute substrate 30 and the growing substrate 20 are separated, the carbon nanotubes can elastically restore to a substantially straight shape and the carbon nanotube array 10 can restore to its original height. Thus, the state of the carbon nanotube array 10 is still capable of having the carbon nanotube structure 40 drawn from the carbon nanotube array 10.

In block A121, to ensure almost all the top ends of the carbon nanotubes in the carbon nanotube array 10 have sufficient contact with the surface of the elastic substitute substrate 30, the elastic substitute substrate 30 and the growing substrate 20 can be brought close enough. A distance from the surface 302 of the elastic substitute substrate 30 to the surface 202 of the growing substrate 20 can be less than or equal to the height of the carbon nanotube array 10 to apply a pressing force (f) to the carbon nanotube array 10. The pressing force f cannot be too large to ensure the state of the carbon nanotube array 10 is still capable of drawing the carbon nanotube film 40 when transferred to the elastic substitute substrate 30. The pressing force is not to press the carbon nanotubes down or vary the length direction of the carbon nanotubes in the carbon nanotube array 10, otherwise the state of the carbon nanotube array 10 could change. Thus, the distance between the surface 302 of the elastic substitute substrate 30 and the surface 202 of the growing substrate 20 cannot be too small and should be larger than an extreme value. The extreme value is a value that causes the state of the carbon nanotube array 10 to be unable to draw the carbon nanotube film 40.

Figure 6:
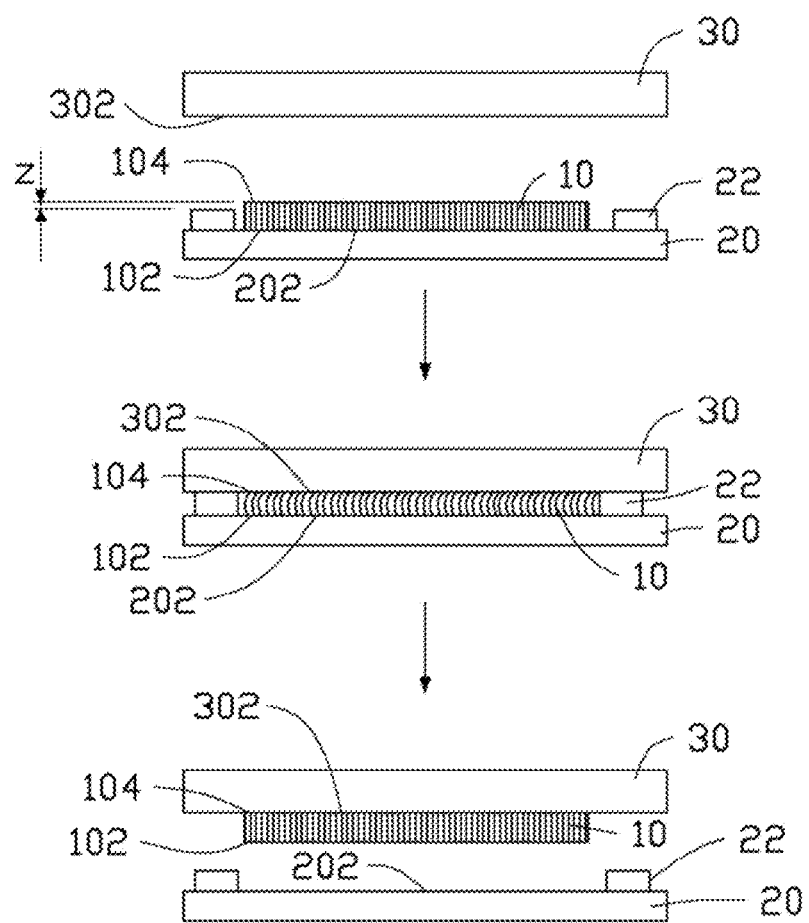
FIG. 6 is a schematic side view of yet another embodiment of the method for transferring the carbon nanotube array.

However, the pressing force is difficult to control, and the height of the carbon nanotube array 10 is often in tens of microns to hundreds of microns. If the pressing force is too large, the carbon nanotubes in the array 10 may be pressed down. Referring to FIG. 6, in one embodiment, a spacing element 22 is provided. The elastic substitute substrate 30 is spaced from the growing substrate 20 by the spacing element 22. The spacing element 22 is used to limit the distance between the surface 302 of the elastic substitute substrate 30 and the surface 202 of the growing substrate 20. The height of the spacing element 22 located between the elastic substitute substrate 30 and the growing substrate 20 is smaller than or equal to the height of the carbon nanotube array 10 and larger than the extreme value. A height distance (z) between the spacing element 22 and the carbon nanotube array 10 can exist. The spacing element 22 is a solid member. In one embodiment, the spacing element 22 is rigid. By controlling the height of the spacing element 22, the distance between the elastic substitute substrate 30 and the growing substrate 20 can be precisely controlled. The height (m) of the spacing element 22 can be 0.9 times to 1 time of the height (n) of the carbon nanotube array 10 (i.e., m=0.9n to n).

During the pressing of the carbon nanotube array 10, the carbon nanotubes in the carbon nanotube array 10 are still substantially perpendicular to the growing surface of the growing substrate 20. When the height (m) is smaller than the height (n), the carbon nanotubes in the carbon nanotube array 10 can be pressed to be curved slightly. However, the curve is small and when the elastic substitute substrate 30 and the growing substrate 20 are separated, the carbon nanotubes can restore the straight shape and the carbon nanotube array 10 can restore the original height. Thus, the state of the carbon nanotube array 10 is still kept to be capable of having the carbon nanotube film 40 drawn from the carbon nanotube array 10.

In one embodiment, the spacing element 22 is arranged on the growing substrate 20. In another embodiment, the spacing element 22 is arranged on the elastic substitute substrate 30. In yet another embodiment, the spacing element 22 can be a part of the growing substrate 20 or the elastic substitute substrate 30. A shape of the spacing element 22 is not limited and can be a block, a piece, a column, or a ball. There can be a plurality of spacing elements 22 uniformly arranged around the carbon nanotube array 10. The spacing element 22 can be a round circle around the carbon nanotube array 10. In another embodiment, the spacing elements 22 are a plurality of round columns uniformly arranged around the carbon nanotube array 10. The spacing element 22 can be used with or without the microstructures 304.

In block A122, a majority of the carbon nanotubes in the carbon nanotube array 10 can be detached from the growing substrate 20 at the same time by cutting means, or moving either the elastic substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the elastic substitute substrate 30 and the growing substrate 20 separate, the two substrates both moves along the direction perpendicular to the growing surface of the growing substrate 20 and depart from each other.

Figure 7:
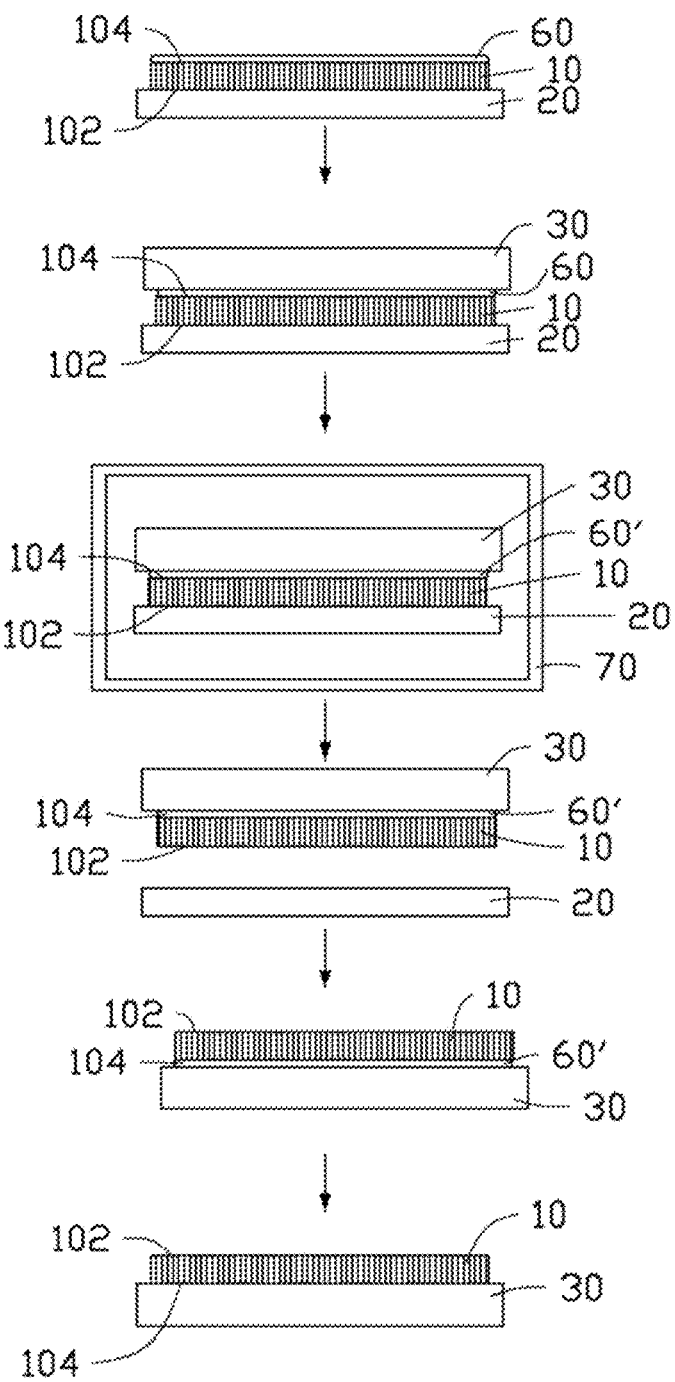
FIG. 7 is a schematic side view of yet another embodiment of the method for transferring the carbon nanotube array.

Referring to FIG. 7, in another one embodiment, block S12 includes blocks B121 to B124.

In block B121, the elastic substitute substrate 30 is placed on the top surface 104 of the carbon nanotube array 10, and liquid medium 60 is sandwiched between the surface 302 of the elastic substitute substrate 30 and the top surface 104 of the carbon nanotube array 10.

In block B122, the liquid medium 60 between the elastic substitute substrate 30 and the carbon nanotube array 10 is solidified into a solid medium 60'.

In block B123, the elastic substitute substrate 30 and the growing substrate 20 are moved away from each other, thereby separating the carbon nanotube array 10 from the growing substrate 20.

In block B124, the solid medium 60' between the elastic substitute substrate 30 and the carbon nanotube array 10 is removed by heating. The carbon nanotube array 10 is transferred from the growing substrate 20 onto the elastic substitute substrate 30. The state of the carbon nanotube array 10, before, during, and after the transfer onto the elastic substitute substrate 30, and after the removal of the solid medium 60', is still capable of having the carbon nanotube film 40 drawn therefrom.

In block B121, the liquid medium 60 can be in a shape of fine droplets, mist, or film. The liquid medium 60 can spread on the entire top surface 104. The liquid medium 60 can be water and/or organic solvents with small molecular weights that are volatile at room temperature or easily evaporated by heating. The organic solvent can be selected from ethanol, methanol, and acetone. The liquid medium 60 has a poor wettability for carbon nanotubes. Thus, when a small amount of the liquid medium 60 is on the top surface 104 of the carbon nanotube array 10, it cannot infiltrate inside the carbon nanotube array 10 and will not affect the state of the carbon nanotube array 10. A diameter of the liquid droplet and a thickness of the liquid film can be in a range from about 10 nanometers to about 300 microns. The elastic substitute substrate 30 and the top surface 104 of the carbon nanotube array 10 are both in contact with the liquid medium 60.

In block B121, to maintain the state of the carbon nanotube array 10 of being capable of drawing the carbon nanotube structure 40, the elastic substitute substrate 30 may apply a pressing force as small as possible to the carbon nanotube array 10. The pressing force can satisfy $0<f<2N/cm^2$. The pressing force does not press the carbon nanotubes down or vary the length direction of the carbon nanotubes in the carbon nanotube array 10. The carbon nanotubes in the carbon nanotube array 10 between the elastic substitute substrate 30 and the growing substrate 20 are always substantially perpendicular to the growing surface of the growing substrate 20.

In one embodiment of the block B121, the liquid medium 60 is formed on the top surface 104 of the carbon nanotube array 10. The liquid medium 60 can be formed into fine droplets or a mist in the air and drop or collect onto the top surface 104 of the carbon nanotube array 10. The elastic substitute substrate 30 and the carbon nanotube array 10 on the growing substrate 20 are brought together such that the surface of the elastic substitute substrate 30 and the liquid medium 60 on the top surface 104 are contacting each other.

In another embodiment of block B121, the liquid medium 60 is formed on the surface of the elastic substitute substrate 30. The liquid medium 60 can be formed into fine droplets or a mist in the air and drop or collect onto the surface of the elastic substitute substrate 30. The elastic substitute substrate 30 and the carbon nanotube array 10 on the growing substrate 20 are brought together such that the top surface 104 of the carbon nanotube array 10 and the liquid medium 60 on the surface of the elastic substitute substrate 30 are contacting each other.

In block B122, the temperature of the liquid medium 60 can be decreased to below the freezing point of the liquid medium 60. After the liquid medium 60 is solidified, the elastic substitute substrate 30 and the carbon nanotube array 10 can be firmly bonded together by the solid medium 60' therebetween. In one embodiment, water is frozen into ice below 0° C.

In one embodiment, the lamination of the growing substrate 20, the carbon nanotube array 10, the liquid medium 60, and the elastic substitute substrate 30 can be put into a freezer 70 with a temperature below the freezing point to freeze the liquid medium 60.

Figure 8:
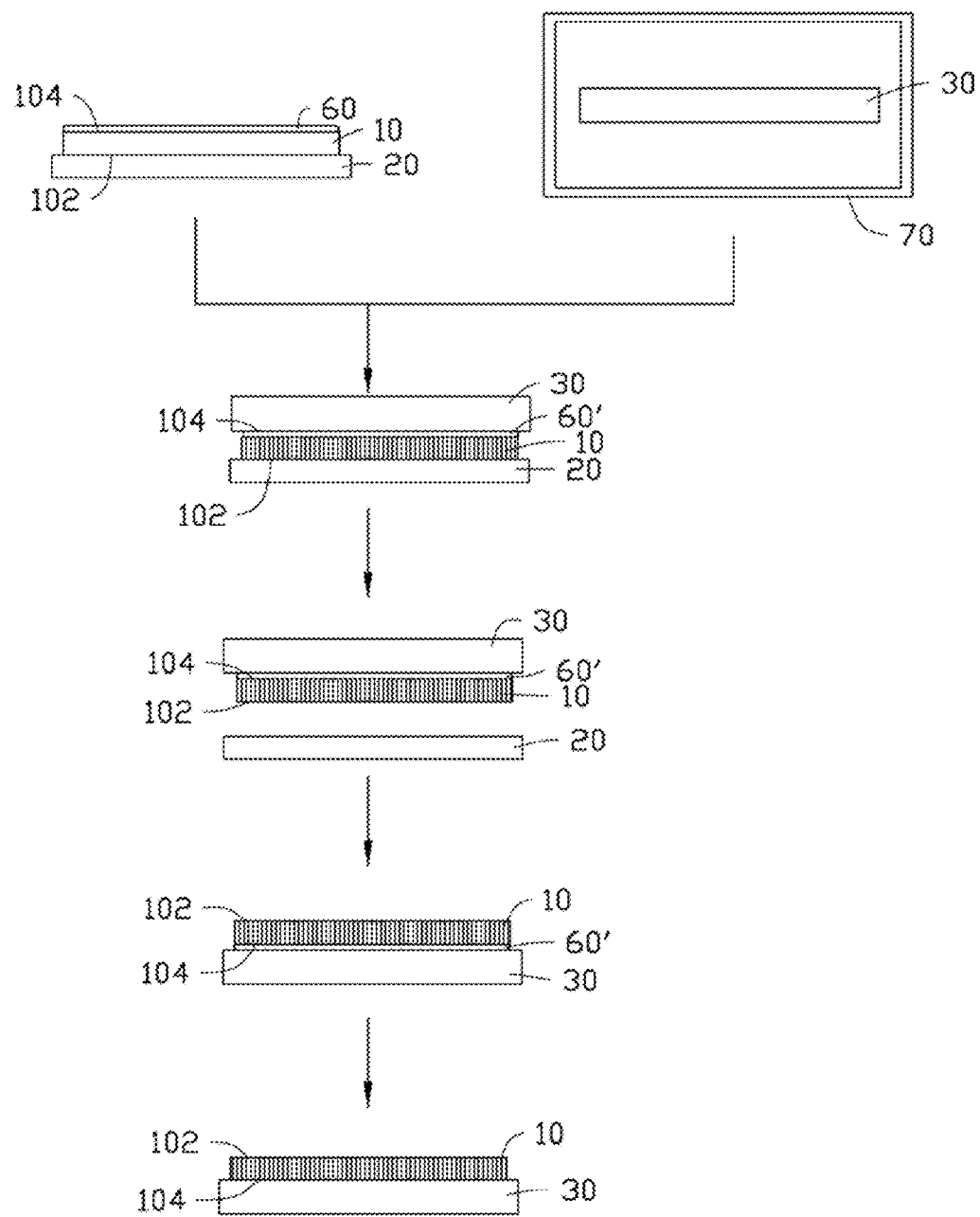
FIG. 8 is a schematic side view of yet another embodiment of the method for transferring the carbon nanotube array.

Referring to FIG. 8, in another embodiment, when the liquid medium 60 is formed on the top surface 104 of the carbon nanotube array 10, a temperature of the elastic substitute substrate 30 can be decreased to below the freezing point before contacting the elastic substitute substrate 30 with the liquid medium 60. For example, the elastic substitute substrate 30 can be kept in the freezer 70 for a period of time until the elastic substitute substrate 30 reaches a temperature below the freezing point. Thus, when the elastic substitute substrate 30 contacts the liquid medium 60 on the top surface 104 of the carbon nanotube array 10, the liquid medium 60 can be directly frozen into solid medium 60'.

In block B123, due to the bonding between the carbon nanotube array 10 and the elastic substitute substrate 30 by the solid medium 60', the separating of the two substrates can separate the carbon nanotube array 10 from the growing substrate 20. During the separating, a majority of the carbon nanotubes in the carbon nanotube array 10 can be detached from the growing substrate 20 at the same time by cutting means, or moving either the elastic substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the elastic substitute substrate 30 and the growing substrate 20 separate, the two substrates both moves along the direction perpendicular to the growing surface of the growing substrate 20 and depart from each other.

In block B124, the heating can melt the solid medium 60' into liquid medium and dry the liquid medium between the elastic substitute substrate 30 and the carbon nanotube array 10. Or, the heating can directly sublimate the solid medium 60'. The removal of the solid medium 60' does not affect the state of the carbon nanotube array 10. Due to the thickness of the solid medium 60' being small, after the removal of the solid medium 60', the top surface 104 of the carbon nanotube array 10 can be in contact with the surface of the elastic substitute substrate 30 and bonded by van der Waals attractive forces.

For drawing the carbon nanotube structure 40, the bonding force between the carbon nanotube array 10 and the elastic substitute substrate 30 should be small. In blocks B122 to B124, the bonding force is increased by the solid medium 60' to separate the carbon nanotube array 10 from the growing substrate 20 and decreased by removing the solid medium 60' before drawing the carbon nanotube structure 40. Thus, the material of the elastic substitute substrate 30 is not limited and can be at least one of plastic and resin, such as polymethyl methacrylate and/or polyethylene terephthalate.

[Stretching of Carbon Nanotube Array]

In block S3, the elastic substitute substrate 30 can be simultaneously stretched along a plurality of directions substantially parallel to the surface 302 of the elastic substitute substrate 30. Due to the stretching along the plurality of directions, the elastic substitute substrate 30 has deformations along the plurality of directions which increase the lengths of the elastic substitute substrate 30 along the plurality of directions. The carbon nanotube array 10 located on the surface 302 of the elastic substitute substrate 30, and the carbon nanotube array 10 also has deformations along the plurality of directions which increase the lengths of the carbon nanotube array 10 along the plurality of directions. The stretching along the plurality of directions can increase the lengths of the elastic substitute substrate 30 along the plurality of directions in the same ratio, and increase the lengths of the carbon nanotube array 10 along the plurality of directions in the same ratio. The stretching along the plurality of directions can increase the size of the carbon nanotube array 10 (i.e., increase the area of the bottom surface 102). In one embodiment, the elastic substitute substrate 30 can be simultaneously stretched along two directions substantially perpendicular to each other. In another embodiment, the elastic substitute substrate 30 can be simultaneously stretched along all the directions substantially parallel to the surface 302 of the elastic substitute substrate 30. For example, the elastic substitute substrate 30 can cover a round supporter, such as a circular frame or a round plate. The round supporter has a size larger than the carbon nanotube array 10 and smaller than the elastic substitute substrate 30. The carbon nanotube array 10 is coaxially arranged with the round supporter. The edges of the elastic substitute substrate 30 protrude out from the edge of the round supporter. The edges of the elastic substitute substrate 30 are pulled along a direction substantially perpendicular to the surface 302 of the elastic substitute substrate 30. Due to the support of the round supporter, the elastic substitute substrate 30 increases the lengths in all the directions substantially parallel to the surface 302.

Figure 9:
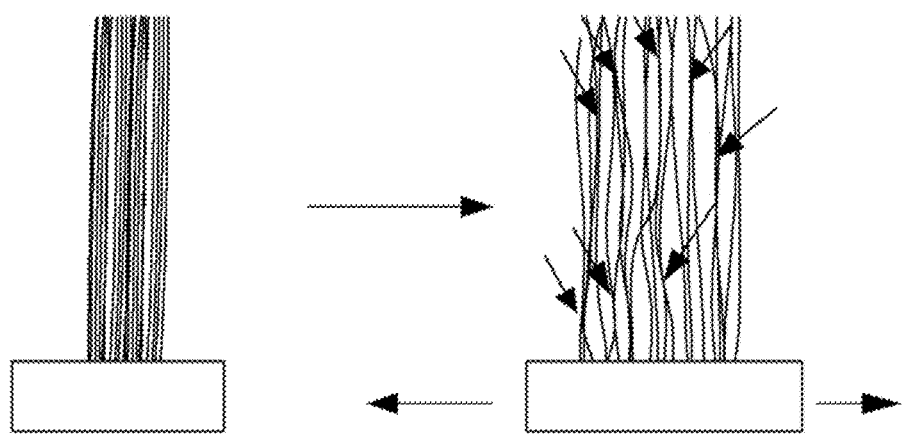
FIG. 9 is a schematic side view of one embodiment of the carbon nanotube array before and after stretching.

Referring to FIG. 9, the carbon nanotube array 10 includes a plurality of carbon nanotubes combined by van der Waals attractive forces. Due to the stretching of the elastic substitute substrate 30, the distances between bottom ends of the carbon nanotubes increase and some of the bottom ends may be spaced from each other. However, the carbon nanotubes are not completely straight, and can be curved. The adjacent carbon nanotubes can still have contacted portions of the sidewalls (as pointed by the arrows in FIG. 9). During the stretching, the contacted portions of the carbon nanotubes decrease. However, the stretching degree of the elastic substitute substrate 30 can ensure that the carbon nanotubes still have enough contacted portions that provide enough van der Waals attractive forces to enable the carbon nanotube film 40 being drawn from the carbon nanotube array 10. The greater the lengths increased along the plurality directions of the carbon nanotube array 10, the smaller the contact portions of the carbon nanotubes, and the smaller the density of the stretched carbon nanotube array 10, and vice versa. A length-change rate can be defined as (length after stretching—length before stretching)/length before stretching×100%. To draw carbon nanotube film 40 from the stretched carbon nanotube array 10, the length-change rate of the carbon nanotube array 10 can be larger than 0 and smaller than or equal to 100%. In one embodiment, the length-change rate of the carbon nanotube array 10 can be about 50%. An area-change rate can be defined as (area of the bottom surface 102 after stretching—area of the bottom surface 102 before stretching)/area of the bottom surface 102 before stretching×100%. To draw carbon nanotube film 40 from the stretched carbon nanotube array 10, the area-change rate of the carbon nanotube array 10 can be larger than 0 and smaller than or equal to 300%. In one embodiment, the area-change rate of the carbon nanotube array 10 can be about 125%.

Figure 10:
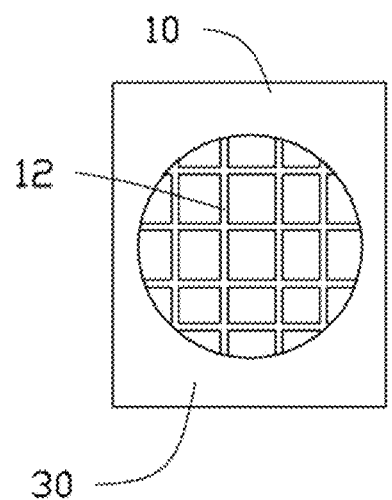
FIG. 10 is a schematic top view of one embodiment of grooves on the carbon nanotube array.
Figure 11:
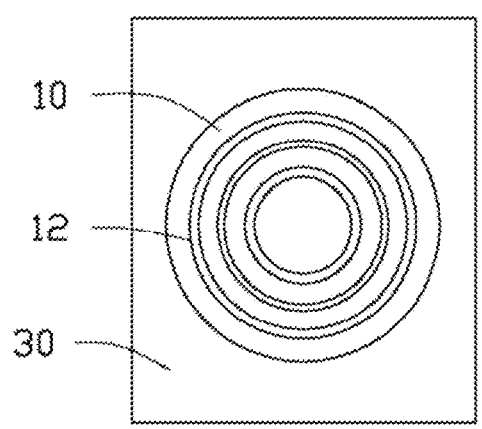
FIG. 11 is a schematic top view of another embodiment of the grooves on the carbon nanotube array.

Referring to FIG. 1 and FIG. 10, in block S2, the grooves 12 can be formed before block S3. The grooves 12 are formed on the bottom surface 102 of the carbon nanotube array 10 on the elastic substitute substrate 30. The grooves 12 can be formed by laser etching the carbon nanotube array 10. The length of the groove 12 can be a straight line or a curved line. Referring to FIG. 10, in one embodiment, the plurality of grooves 12 can be substantially parallel to each other and along at least two directions substantially perpendicular to each other. Referring to FIG. 11, in another embodiment, one or a plurality of circular shaped grooves 12 can be formed on the bottom surface 102 of the carbon nanotube array 10 and coaxially arranged with the carbon nanotube array 10. The length direction of at least one groove 12 can be substantially perpendicular to at least one of the stretching directions. The grooves 12 can have a depth that is smaller than the height of the carbon nanotube array 10 (i.e., smaller than the length of the carbon nanotubes in the array 10). The length of the grooves 12 can be smaller than or equal to the length of the carbon nanotube array 10 along the second direction (y).

Figure 12:
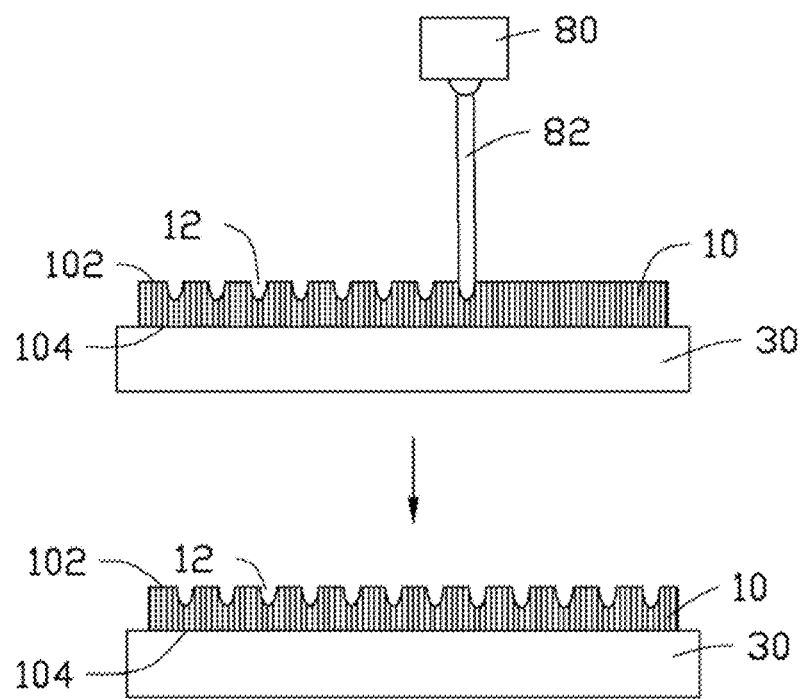
FIG. 12 is a schematic side view of an embodiment of a method for forming grooves on the carbon nanotube array transferred on an elastic substitute substrate.

Referring to FIG. 12, a laser etching device 80 can be used to emit a laser beam 82 to scan the bottom surface 102 of the carbon nanotube array 10. The carbon nanotubes absorb the energy of the laser beam 82 and heated to react with $O_2$ gas in air to form $CO_2$ gas. Therefore, the scanned location of the bottom surface 102 is etched to form grooves 12. The laser etching device 80 can be a pulsed laser generator. The laser beam 82 can have a power in a range from about 1 W to about 100 W and a power density larger than $0.053 \times 10^{12}$ $W/m^2$ on the bottom surface 102. The depth of the grooves 12 depends on the power density of the laser beam 82 and the scanning speed of the laser beam 82 on the bottom surface 102.

The carbon nanotubes in the carbon nanotube array 10 are combined by van der Waals attractive forces. The carbon nanotube array 10 can have stronger van der Waals attractive forces at some places of the carbon nanotube array 10, and weaker van der Waals attractive forces at other places of the carbon nanotube array 10. During the stretching of the elastic substitute substrate 30, cracks can be formed on the surface 102 at the places having weaker van der Waals attractive forces, thus making the stretched carbon nanotube array less uniform. The grooves 12 formed along the second direction are artificially weaker places which decreases the possibility of crack formation during the stretching along the first direction. The carbon nanotubes are not completely removed but shortened by the laser etching, thus the carbon nanotubes are still combined by van der Waals attractive forces in the grooves, and the carbon nanotube film 40 drawn from the etched array 10 is still an integrated structure. The depth of the grooves 12 can be about 30% to about 60% of the height of the carbon nanotube array 10. The width of the grooves 12 can be in a range from about 10 microns to about 100 microns. In one embodiment, the grooves 12 have a depth in a half of the height of the carbon nanotube array 10 and a width of about 20 microns. The plurality of the grooves 12 can be uniformly spaced from each other.

Figure 13:
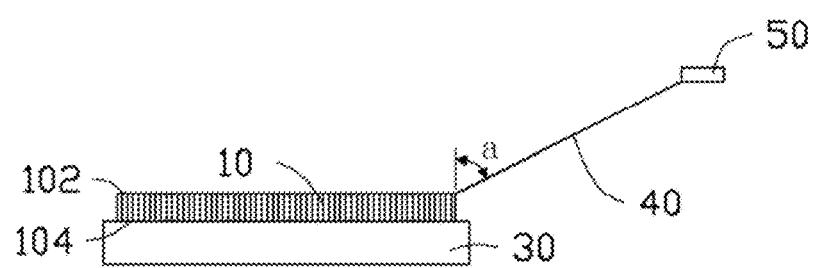
FIG. 13 is a schematic side view of an embodiment of the method for forming the carbon nanotube film.

Referring to FIG. 13 and FIG. 1, the carbon nanotube film 40 is drawn from the stretched carbon nanotube array 10 that was transferred to the elastic substitute substrate 30, not from the carbon nanotube array 10 located on the growing substrate 20. The carbon nanotube array 10 is transferred to the elastic substitute substrate 30 before the stretching of the elastic substitute substrate 30 and stretched with and by the stretching of the elastic substitute substrate 30. In one embodiment of block S4, the carbon nanotube film 40 can be drawn from the carbon nanotube array 10 upside down on the surface of the elastic substitute substrate 30 (i.e., drawn from the bottom surface 102 of the carbon nanotube array 10). The stretched carbon nanotube array 10 has a greater length along the first direction caused by the stretching compared with the original carbon nanotube array 10 grown on the growing substrate 20. Thus, the carbon nanotube film 40 drawn from the stretched carbon nanotube array 10 along the second direction has a greater width. The second direction can be different from the first direction. In one embodiment, the second direction is substantially perpendicular to the first direction. An angle between the second direction and the surface 302 of the elastic substitute substrate 30 can also be smaller than 90 degrees.

Block S4 can include block S41 and S42.

In block S41, a carbon nanotube segment having a predetermined width is drawn from the carbon nanotube array 10 on the elastic substitute substrate 30. The segment is selected using a drawing tool 50 (e.g., adhesive tape or other tool allowing multiple carbon nanotubes to be gripped and pulled simultaneously);

In block S42, a plurality of carbon nanotube segments joined end to end by van der Waals attractive force is drawn by moving the drawing tool 50, thereby forming a continuous carbon nanotube film 40.

In block S41, the carbon nanotube segment includes a single carbon nanotube or a plurality of carbon nanotubes substantially parallel to each other. The drawing tool 50 such as adhesive tape can be used for selecting and drawing the carbon nanotube segment. The adhesive tape can contact the carbon nanotubes in the carbon nanotube array to select the carbon nanotube segment. The drawing tool 50 can select a large width of carbon nanotube segments to form the carbon nanotube film. In one embodiment, an entire length of the carbon nanotube array 10 perpendicular to the second direction is selected by the drawing tool 50.

In block S42, an angle between a drawing direction of the carbon nanotube segments and the growing direction of the carbon nanotubes in the carbon nanotube array 10 can be greater than 0 degrees (e.g., 30° to 90°).

Blocks A122 and B123 are different from block S4. The purpose of blocks A122 and B123 is to separate the carbon nanotube array 10 as a whole from the growing substrate 20. The carbon nanotube array 10 is separated from the growing substrate 20 still in the array shape. The purpose of block S4 is to draw out carbon nanotubes one by one or segment by segment to form a carbon nanotube film or wire from the carbon nanotube array 10 on the elastic substitute substrate 30.

In the present method for making the carbon nanotube film 40, the growing of the carbon nanotube array 10 and the drawing of the carbon nanotube film 40 can be processed on different substrates. The elastic substitute substrate 30 can be made of an inexpensive material, and the expensive growing substrate 20 can be recycled quickly and used again for growing new carbon nanotube arrays 10, thus speeding up the production of the carbon nanotube arrays 10. The carbon nanotube film 40 drawn from the stretched carbon nanotube array 10 can have a larger transparency than that drawn from the unstretched carbon nanotube array 10.

Depending on the embodiment, certain of the blocks of the methods described may be removed, others may be added, and the sequence of blocks may be altered. It is also to be understood that the description and the claims drawn to a method may include some indication in reference to certain blocks. However, the indication used is only to be viewed for identification purposes and not as a suggestion as to an order for the blocks.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for forming a carbon nanotube film, the method comprising:
   providing a carbon nanotube array transferred onto a surface of an elastic substitute substrate, the carbon nanotube array being configured for drawing a carbon nanotube film therefrom, the carbon nanotube film comprising a plurality of carbon nanotubes joined end to end;
   stretching the elastic substitute substrate along a plurality of stretching directions thereby forming a stretched carbon nanotube array having increases in lengths along the plurality of stretching directions; and
   drawing the carbon nanotube film from the stretched carbon nanotube array.

2. The method of claim 1, wherein the carbon nanotube array is transferred to the elastic substitute substrate by:
   providing a growing substrate having the carbon nanotube array grown thereon, the carbon nanotube array having a bottom surface adjacent to the growing substrate and a top surface away from the growing substrate; and
   transferring the carbon nanotube array from the growing substrate to the elastic substitute substrate, the carbon nanotube array still being configured for drawing the carbon nanotube film from the elastic substitute substrate.

3. The method of claim 2, wherein the transferring the carbon nanotube array from the growing substrate to the elastic substitute substrate comprises:
   contacting the surface of the elastic substitute substrate to the top surface of the carbon nanotube array; and
   separating the elastic substitute substrate from the growing substrate, thereby separating the bottom surface of the carbon nanotube array from the growing substrate.

4. The method of claim 3, wherein the surface of the elastic substitute substrate and the top surface of the carbon nanotube array are combined only by van der Waals attractive forces.

5. The method of claim 3, wherein the surface of the substitute substrate has a plurality of microstructures located thereon.

6. The method of claim 3, wherein the substitute substrate is spaced from the growing substrate by a spacing element, the spacing element has a height between the substitute substrate and the growing substrate less than or equal to the height of the carbon nanotube array.

7. The method of claim 2, wherein the transferring the carbon nanotube array from the growing substrate to the elastic substitute substrate comprises:
   placing the elastic substitute substrate on the top surface of the carbon nanotube array and sandwiching liquid medium between the elastic substitute substrate and the carbon nanotube array;
   solidifying the liquid medium between the elastic substitute substrate and the carbon nanotube array into solid medium;
   separating the elastic substitute substrate from the growing substrate, thereby separating the bottom surface of the carbon nanotube array from the growing substrate; and
   removing the solid medium between the elastic substitute substrate and the carbon nanotube array.

8. The method of claim 7, wherein the sandwiching the liquid medium between the elastic substitute substrate and the carbon nanotube array comprises:
   forming the liquid medium on the top surface of the carbon nanotube array; and
   contacting the surface of the elastic substitute substrate and the liquid medium on the top surface with each other.

9. The method of claim 8, wherein the solidifying the liquid medium between the substitute substrate and the carbon nanotube array comprises contacting the substitute substrate having a temperature below a freezing point with the liquid medium on the top surface of the carbon nanotube array.

10. The method of claim 7, wherein the sandwiching the liquid medium between the substitute substrate and the carbon nanotube array comprises:
    forming the liquid medium on the surface of the substitute substrate; and
    contacting the top surface of the carbon nanotube array and the liquid medium on the surface of the substitute substrate with each other.

11. The method of claim 7, wherein the liquid medium is in a shape of a plurality of droplets, mist, or film, and a diameter of the droplet and a thickness of the film is in a range from about 10 nanometers to about 300 microns.

12. The method of claim 7, wherein the solidifying the liquid medium between the substitute substrate and the carbon nanotube array comprises placing a lamination of the growing substrate, the carbon nanotube array, the liquid medium, and the substitute substrate into a freezer, the freezer having an internal temperature below a freezing point of the liquid medium.

13. The method of claim 1, wherein an area-change rate of the carbon nanotube array is larger than 0 and smaller than or equal to 300%.

14. The method of claim 1 further comprising forming at least one groove on the carbon nanotube array, a length direction of the at least one groove is substantially perpendicular to at least one of the plurality stretching directions.

15. The method of claim 14, wherein the at least one groove is formed by laser etching.

16. The method of claim 14, wherein the at least one groove is a circular groove coaxially arranged with the carbon nanotube array.

17. The method of claim 14, wherein the at least one groove comprises a plurality of grooves having length directions along two directions substantially perpendicular to each other.

18. The method of claim 14, wherein a depth of the at least one groove is smaller than a height of the carbon nanotube array.

19. The method of claim 14, wherein a depth of the at least one groove is about 30% to about 60% of a height of the carbon nanotube array.

20. The method of claim 14, wherein a width of the at least one groove is about 10 microns to about 100 microns.

* * * * *